United States Patent
Oishi

(10) Patent No.: US 8,208,538 B2
(45) Date of Patent: *Jun. 26, 2012

(54) SIGNAL PROCESSING APPARATUS

(75) Inventor: Akihiro Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 12/751,622

(22) Filed: Mar. 31, 2010

(65) Prior Publication Data

US 2010/0189176 A1    Jul. 29, 2010

Related U.S. Application Data

(60) Continuation of application No. 11/123,057, filed on May 6, 2005, now Pat. No. 7,720,144, which is a division of application No. 10/236,982, filed on Sep. 9, 2002, now Pat. No. 6,952,447.

(30) Foreign Application Priority Data

Sep. 25, 2001   (JP) .................................. 2001-290932

(51) Int. Cl.
*H04N 7/12* (2006.01)
*G06K 9/00* (2006.01)

(52) U.S. Cl. ................... 375/240.03; 382/251
(58) Field of Classification Search ....... 375/240.02–240.12; 382/232, 382/251
See application file for complete search history.

(56) References Cited

U.S. PATENT DOCUMENTS

| | | | |
|---|---|---|---|
| 5,245,427 A | 9/1993 | Kunihiro | |
| 5,333,012 A * | 7/1994 | Singhal et al. | 375/240.04 |
| 5,396,292 A | 3/1995 | Murata | |
| 5,432,556 A | 7/1995 | Hatano | |
| 5,933,532 A | 8/1999 | Mihara | |
| 6,463,100 B1 | 10/2002 | Cho | |
| 6,477,202 B1 | 11/2002 | Takeuchi | |
| 6,480,539 B1 | 11/2002 | Ramaswamy | |
| 6,529,552 B1 | 3/2003 | Tsai | |
| 6,563,872 B2 | 5/2003 | Suzuki | |
| 6,567,554 B1 * | 5/2003 | Sugahara et al. | 382/232 |
| 6,590,936 B1 | 7/2003 | Kadono | |
| 6,600,783 B1 | 7/2003 | Morita | |
| 6,628,839 B1 | 9/2003 | Komiya | |
| 6,678,324 B1 * | 1/2004 | Yamauchi | 375/240.04 |
| 6,690,833 B1 | 2/2004 | Chiang | |
| 6,697,567 B1 | 2/2004 | Suzuki | |
| 6,795,501 B1 | 9/2004 | Zhu | |
| 6,801,572 B2 | 10/2004 | Yamada | |
| 6,831,947 B2 | 12/2004 | Ribas Corbera | |
| 6,834,080 B1 * | 12/2004 | Furukawa et al. | 375/240.02 |
| 7,177,358 B2 * | 2/2007 | Inomata et al. | 375/240.12 |
| 7,881,373 B2 * | 2/2011 | Mihara et al. | 375/240.04 |

FOREIGN PATENT DOCUMENTS

JP    7-264582    10/1995
JP   10-075451    3/1998

* cited by examiner

*Primary Examiner* — Gims Philippe

(74) *Attorney, Agent, or Firm* — Fitzpatrick, Cella, Harper & Scinto

(57) ABSTRACT

An image signal processing apparatus for quantizing an inputted moving image signal according to a quantization step so that a code amount of one frame becomes a target code amount, and for variable-length-coding the quantized moving image signal, in which a minimum value of the quantization step is determined for each frame, and the quantization step is determined so as not to be less than the minimum value.

12 Claims, 4 Drawing Sheets

FIG. 5

| | | | | | | | | | | | | | | | | | |
|---|---|---|---|---|---|---|---|---|---|---|---|---|---|---|---|---|---|
| 10 | 10 | 10 | 10 | 6 | 9 | 9 | 8 | 8 | . | . | 15 | 16 | 15 | 16 | 20 | 20 | |
| 7 | 7 | 6 | 9 | 7 | 7 | 9 | 8 | 8 | . | . | 17 | 17 | 19 | 18 | 19 | 20 | |
| 10 | 10 | 6 | 8 | 8 | 10 | 9 | 10 | 11 | . | . | 20 | 20 | 21 | 20 | 20 | 20 | |
| . | . | . | . | . | . | . | . | . | . | . | . | . | . | . | . | . | |
| . | . | . | . | . | . | . | . | . | . | . | . | . | . | . | . | . | |
| 10 | 10 | 10 | 10· | 6· | 7· | 9· | 8· | . | . | . | 15· | 15· | 19· | 17· | 17· | 20· | |
| 10· | 10· | 10· | 10· | 6· | 8· | ·7 | ·10 | . | . | . | ·14 | ·15 | ·17 | ·18 | ·19 | ·20 | |
| . | . | . | . | . | . | . | . | . | . | . | . | . | . | . | . | . | |
| . | . | . | . | . | . | . | . | . | . | . | . | . | . | . | . | . | ~501 |

| | | | | | | | | | | | | | | | | |
|---|---|---|---|---|---|---|---|---|---|---|---|---|---|---|---|---|
| 10 | 10 | 10 | 10 | 10 | 10 | 10 | 10 | . | . | 12 | 12 | 12 | 13 | 13 | 13 | |
| 10 | 10 | 10 | 10 | 10 | 10 | 10 | 10 | . | . | 13 | 13 | 12 | 13 | 14 | 14 | |
| 10 | 10 | 10 | 10 | 10 | 10 | 10 | 10 | . | . | 14 | 14 | 13 | 14 | 14 | 14 | |
| . | . | . | . | . | . | . | . | . | . | . | . | . | . | . | . | |
| . | . | . | . | . | . | . | . | . | . | . | . | . | . | . | . | |
| 10 | 10 | 10 | 10· | 10· | 10· | 10· | 10· | . | . | 12 | 12· | 13· | 13· | 13· | 14· | |
| 10 | 10 | 10 | 10· | 10· | 10· | ·10 | ·10 | . | . | ·12 | ·13 | ·13 | ·14 | ·13 | ·14 | ~502 |

SIGNAL PROCESSING APPARATUS

This application is a continuation of application Ser. No. 11/123,057, filed May 6, 2005, which is a division of application Ser. No. 10/236,982, filed Sep. 9, 2002, issued on Oct. 4, 2005 as U.S. Pat. No. 6,952,447.

BACKGROUND OF THE INVENTION

1. Field of the Invention

The present invention relates to a signal processing apparatus, and in particular, to coding process of an image signal.

2. Related Background Art

The MPEG standard is known as an image signal compression and coding technology.

In a coding circuit for coding the image signal and thereby generating data in accordance with the MPEG standard, a target code amount is determined for each picture based on a target data rate. And based on the target code amount of each picture, the target code amount is assigned equally to all the macro blocks constituting each picture.

Thereafter, a quantization step for coding each macro block is determined in order to obtain the target code amount, and then coding is performed.

Thus, if the quantization step is set by establishing the target code amount equally to each macro block, the following problems may be raised.

For instance, in the case where there are a macro block including an almost motionless image and a macro block including an image having large motion in one P or B picture, almost no difference data can be obtained from the macro block of the almost motionless image. For that reason, the quantization step for attaining the target code amount is set to be small.

Inversely, as for the macro block of the image large motion, the value of difference data is large so that the quantization step must be set to be large in order to render the code amount of the macro block smaller than the target code amount.

However, as for the almost motionless image, even if it is coded by rendering the quantization step smaller than necessary, this coding results in increase of the code amount, while this increase does not result in significant effect visually. On the other hand, as for the image having large motion, setting the quantization step to be small will result in significant effect visually. Nevertheless, the quantization step cannot be set to be small since such the smaller quantization step results in code amount that exceeds the target code amount set equally for each macro block.

Thus, the target code amount is assigned equally to each macro block in the prior art, and so it is impossible to assign a large code amount to a. portion which is less effective visually and assign a necessary code amount to a portion which is more effective visually.

SUMMARY OF THE INVENTION

An object of the present invention is to solve these problems.

Another object of the present invention is to implement assignment of a code amount without any waste.

A further object of the present invention is to determine an optimum quantization step considering visual effects.

In order to solve these problems, according to a scope of the present invention, an image signal processing apparatus of the present invention comprises: quantization means for quantizing an inputted moving image signal according to a quantization step; coding means for variable-length-coding the moving image signal quantized by the quantization means; and control means for determining a minimum value of the quantization step in predetermined units and determining the quantization step so as not to be less than the minimum value.

Any object and characteristic of the present invention other than those described above will be clarified by the following detailed description of the embodiments of the present invention referring to the drawings.

BRIEF DESCRIPTION OF THE DRAWINGS

FIG. 5 is a diagram showing an appearance of a quantization step in one frame.

DESCRIPTION OF THE PREFERRED EMBODIMENTS

Hereafter, embodiments of the present invention will be described by using the drawings.

Figure 2:
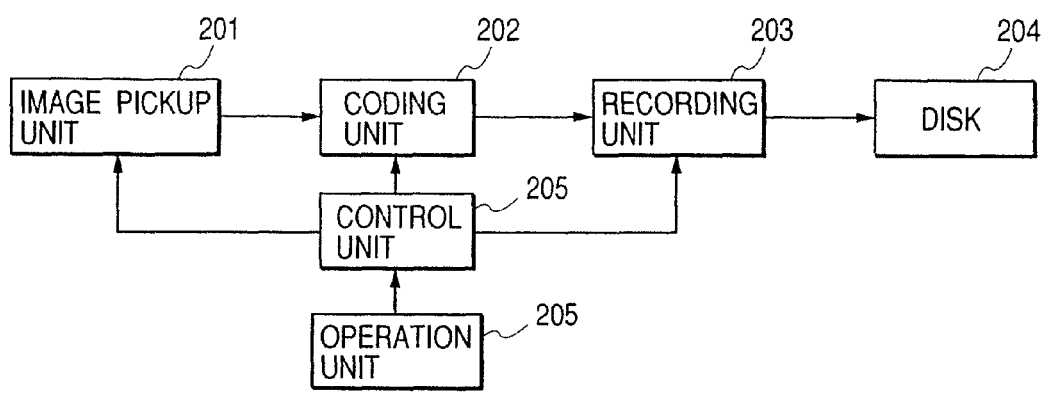
FIG. 2 is a diagram showing a configuration of an image pickup apparatus to which the present invention is applied.

FIG. 2 is a block diagram showing a configuration of an image pickup apparatus to which the present invention is applied.

In FIG. 2, an image pickup unit 201 includes an optical system such as a lens and its drive mechanism, an image pickup element such as a CCD, and a conventional camera signal processing circuit and so on. A coding unit 202 codes a moving image signal outputted from the image pickup unit 201 in accordance with the MPEG method using motion compensation predictive coding, and outputs the coded signal to a recording unit 203. The recording unit 203 adds an error correction check code, synchronization data and other additional data to the coded moving image signal from the coding unit 202 to convert it into a form of a recording format, and records the converted signal on a magneto-optical disk 204 with a conventional magneto-optical recording method.

In addition, a control unit 205 controls operation of each unit of the apparatus according to an instruction by a user's operation of an operation unit 206.

Next, the coding unit 202 which is a characteristic configuration of this embodiment will be described.

Figure 1:
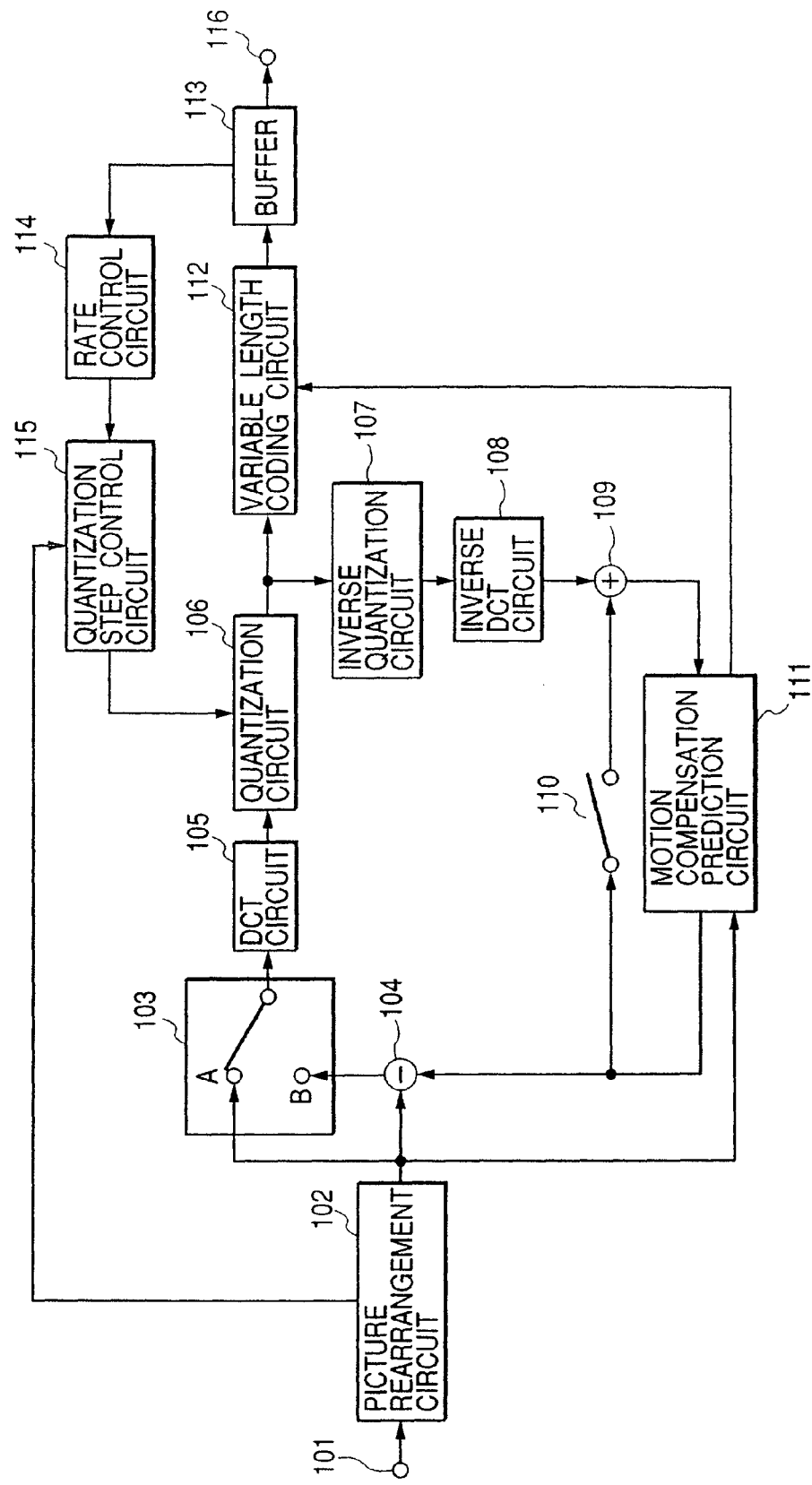
FIG. 1 is a diagram showing a configuration of a coding unit to which the present invention is applied.

FIG. 1 is a diagram showing a configuration of the coding unit 202.

The coding unit 202 in FIG. 1 performs coding process in accordance with the MPEG2 method using motion compensation predictive coding, as previously mentioned. In the MPEG2 method, coding is performed by selectively using intra-coding and inter-coding for each frame. The intra-coding is a coding method of performing the coding only by using data in the same frame, and the inter-coding is a coding method of performing the coding by using a plurality of frames.

In addition, the MPEG2 provides three picture types, I picture for coding all the data of one frame by the intra-coding, P picture for performing predictive coding by using a preceding frame and B picture for performing predictive coding by using preceding and subsequent frames. And a set of frames from one I picture to a frame immediately before the next I picture is called GOP (Group Of Pictures), which can be handled as one coding unit.

In FIG. 1, the moving image signal outputted from the image pickup unit 201 is outputted to a picture rearrangement circuit 102 via an input terminal 101. The picture rearrangement circuit 102 has a memory capable of storing the moving image signals of a plurality of frames, and changes order of frames of the inputted moving image signals to the order adequate for coding and outputs the rearranged signals.

The operation of the picture rearrangement circuit 102 will be described by using FIG. 3.

Figure 3:
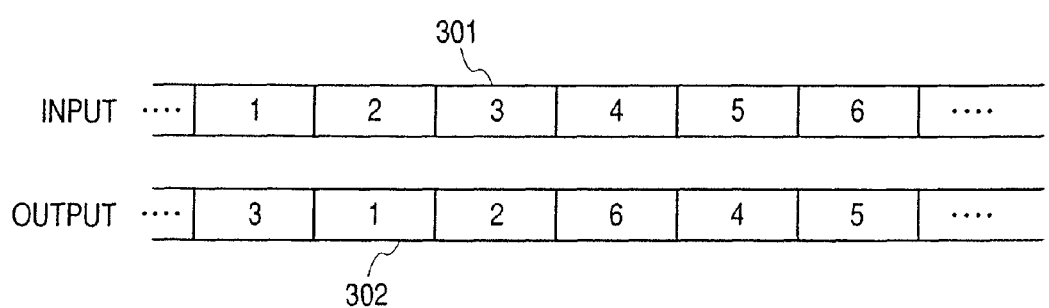
FIG. 3 is a diagram showing an appearance of order of image data accompanying coding process.

Reference numeral 301 in FIG. 3 denotes the order of frames of the moving image signals to be inputted to the picture rearrangement circuit 102, which signals inputted in order of a first frame, a second frame, a third frame . . . . Reference numeral 302 denotes the order of the moving image data outputted from the picture rearrangement circuit 102, which outputs the signals in order of the third frame, first frame, second frame . . . .

Figure 4:
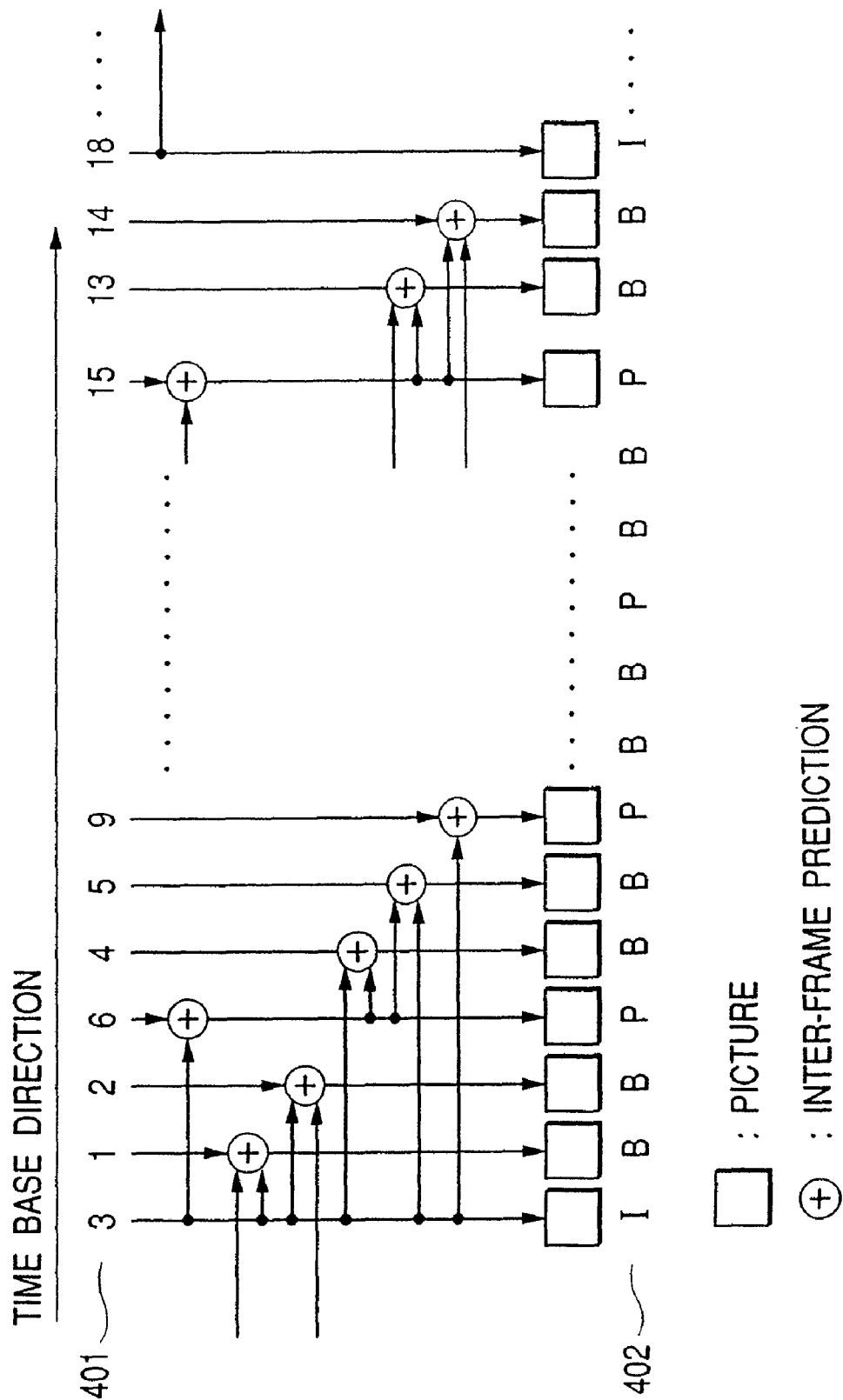
FIG. 4 is a diagram showing predictive coding operation.

FIG. 4 is a diagram showing an appearance of the coding of the moving image signals thus outputted as I picture, P picture and B picture.

Numerals denoted by a reference numeral 401 in FIG. 4 corresponds to the frame numbers in FIG. 3, and 402 denotes the picture types of each frame. In FIG. 4, 15 frames constitute one GOP, and the third frame is the I picture at the head. The first and second frames are the B pictures of the preceding GOP, and as shown in FIG. 4, the first and second frames are coded by using an image signal of the third frame which is the I picture and the image signal of the P picture of the immediately preceding GOP. In addition, since the third frame is the I picture, it is only coded with the image data of the third frame. In addition, the sixth frame is the P picture, and forward predictive coding is performed thereto by using the third frame which is the immediately preceding I picture. Hereafter, the image signals of the B picture and P picture are coded likewise respectively.

In order to implement such coding process, the image signal outputted from the picture rearrangement circuit 102 in the order of FIG. 3 or FIG. 4 is outputted to a switch 103, a subtractor 104 and a motion compensation predictive coding circuit 111.

In the case where the image signal of the I picture is outputted, the switch 103 is connected to a terminal A, and the image signal outputted from the picture rearrangement circuit 102 is outputted as it is to a DCT circuit 105.

In addition, in the case of the P picture or B picture, the switch 103 is connected to a terminal B side. The subtractor 104 obtains the difference between the image signal of the P picture or B picture outputted from the picture rearrangement circuit 102 and a predictive image signal from the motion compensation predictive circuit 111, and outputs it to the DCT circuit 105 via the switch 103. Thus, redundancy in a time-axis direction is reduced.

The DCT circuit 105 DCT-processes the image data of the I picture or difference data of the P picture or B picture outputted from the switch 103, and outputs the processed data to a quantization circuit 106. The quantization circuit 106 quantizes a DCT coefficient of each picture outputted from the DCT circuit 105 in accordance with a quantization step indicated by a quantization step calculation circuit 115 as mentioned later, and outputs the quantized data to an inverse quantization circuit 107 and a variable-length coding circuit 112.

The variable-length coding circuit 112 variable-length-codes quantized image data, and outputs the coded data to a buffer memory 113. The image data stored in the buffer memory 113 is read in predetermined timing, and is outputted to the recording unit 203 via an output terminal 116.

On the other hand, the inverse quantization circuit 107 inversely quantizes the image signal from the quantization circuit 106, and outputs the inverse-quantized signal to an inverse DCT circuit 108. The inverse DCT circuit 108 inversely DCT-processes the inversely quantized image signal and outputs the processed signal to an adder 109.

Here, in the case where the data from the inverse DCT circuit 108 is that of the I picture, a switch 110 is turned off, and the image data outputted from the inverse DCT circuit 108 passes through the adder 109 as it is to be outputted to the motion compensation predictive circuit 111. In addition, in the case where the data from the inverse DCT circuit 108 is the P picture or B picture, the switch 110 is turned on. And the predictive image signal outputted to the subtractor 104 and the data (local decode data) from the inverse DCT circuit 108 are added by the adder 109 to be outputted to the motion compensation predictive circuit 111.

The motion compensation predictive circuit 111 includes a memory for storing the locally-decoded data of the I picture and P picture outputted from the adder 109, and divides the data of the P picture or B picture into a plurality of macro blocks comprised of a plurality of pixels respectively and reads them into a macro block valley. And it compares the data of the P picture or B picture outputted from the picture rearrangement circuit 102 to the image data of a reference frame stored in the memory in the units of a macro block so as to detect the predictive image signal of a smaller difference and a motion vector thereof. And it outputs the predictive image signal to the subtractor 104, and also outputs the data of the motion vector to the variable-length coding circuit 112. The variable-length coding circuit 112 also codes the data of the motion vector, and outputs the coded motion vector together with the image data to the buffer memory 113.

A rate control circuit 114 monitors the amount of the coded image data stored in the buffer memory 113, to inform the quantization step control circuit 115 thereof. The quantization step control circuit 115 determines a target code amount for each picture so as to attain a specified target data rate, based on the amount of the image data stored in the buffer memory 113 and the information on the picture type indicated by the picture rearrangement circuit 102.

Moreover, the target data rate may be automatically set by the apparatus, or it is also possible for the user to set an arbitrary value by operating the operation unit 206.

And in this embodiment, a minimum value of the quantization step for each picture is determined according to a specified target data rate. To be more specific, the quantization step control circuit 115 has quantization tables each of which includes different quantization steps corresponding to different numbers, and of the quantization tables, those having the quantization steps corresponding to the number smaller than the number established as the minimum value thereof are not used. For instance, in the case where the target data rate is 6 Mbps, the minimum value of the quantization step of the I picture is 8, that of the P picture is 9, and that of the B picture is 12.

And the quantization step is calculated by assigning the target code amount equally to each macro block. In this case, however, the quantization step of each macro block is set so that the quantization step will not be less than the minimum value set for each picture. As a result of thus setting the quantization step, codes of a macro block whose code amount does not reach the target code amount is assigned to another macro block of which quantization step is not less than the minimum value.

And the quantization step control circuit 115 outputs to the quantization circuit 106 the quantization step of each macro block which is finally set. It also outputs the information indicating the quantization step of each macro block to the recording unit 203 in FIG. 2. The recording unit 203 adds the information indicating the quantization step of each macro block to the coded image data to be recorded together.

FIG. 5 is a diagram showing an example of the quantization step of a large number of macro blocks in one frame.

Reference numeral 501 denotes a diagram showing an appearance of the quantization step of each macro block in the case of setting no minimum value of the quantization step, and 502 denotes a diagram showing an appearance of the quantization step of each macro block in this embodiment with the minimum value of the quantization step set.

In the diagram 501, the quantization steps of the macro blocks on the upside of a picture are set to be relatively small such as 6 to 8, and those of the macro blocks on the downside of the picture are set to be relatively large such as 14 to 20. For this reason, it is considered that the image quantized in the quantization step in FIG. 5 has relatively less motion on the upside of the screen, and has a relatively larger motion on the downside of the screen.

Here, in case of setting the minimum value of the quantization step at 10, the quantization steps of the macro blocks on the upside of the screen become approximately 10 as shown in the diagram 502. And extra code amounts generated as a result of rendering the quantization steps larger than in the diagram 501 are assigned to the macro blocks on the downside of the screen so that the quantization steps of the macro blocks on the downside of the diagram 502 can be rendered smaller than in the diagram 501 such as 12 to 14 and a higher-resolution image can be obtained. Moreover, even in the case where the quantization steps are thus changed, there is no difference in a data amount per one picture.

Thus, according to this embodiment, the minimum value of the quantization step is set for each picture type, and the quantization step of each macro block is set not to be less than the minimum value, so that it is possible to avoid assigning a large code amount to the macro blocks whose visual effects cannot be expected even if the quantization step is rendered small.

Next, a second embodiment will be described. In this embodiment, applied configurations are the same as those in FIGS. 1 and 2.

While the target code amount of each picture is assigned based on the specified target data rate in the first embodiment, the minimum value of the quantization step is further set for each picture according to a characteristic of input image data in this embodiment.

To be more specific, a degree of the motion of the input image data is detected from results of comparing the data between the frames of the image data inputted by the picture rearrangement circuit 102 or from totaling values of the motion vectors of one frame detected by the motion compensation predictive circuit 111.

In the case of less motion, it is considered that the difference value from the predictive image signal becomes smaller as to the data of the P picture or B picture, and so the minimum value of the quantization step of the I picture is set to be smaller, and the minimum values of the quantization steps of the P picture and B picture are set to be larger.

In addition, in the case of larger motion with random movement of the image, the minimum value of the quantization step of the I picture is established not to be different from those of the P picture and B picture.

Thus, it is possible, by changing the minimum value of the quantization step of each picture according to the characteristic of the input image, to effectively assign the code amount according to the characteristic of the image.

Moreover, while the characteristic of the input image data is detected to determine the degree of motion, based on the results of comparing the image data between the frames by the picture rearrangement circuit 102 or totaling the motion vectors in the second embodiment, it is also possible, by using a vibration correcting function of the image pickup unit 201 in FIG. 2 for instance, to attain a configuration wherein the data showing vibration amount obtained from an angular speed sensor or image processing is inputted from the image pickup unit 201 and the motion of the input image data is determined based thereon.

Furthermore, it is also possible to determine the motion based on an operation signal of a zoom key by the operation unit 206.

To be more specific, in the case where zoom speed is slow, it is considered that the motion may be detected between the frames but the difference value from the predictive image signal also becomes smaller. Therefore, as in the case of less motion, the minimum value of the quantization step of the I picture should be set to be smaller, and the minimum value of the quantization steps of the P picture and B picture should be set to be larger.

In addition, while the cases of applying the present invention to the image pickup apparatus are described in the aforementioned embodiments, it is also possible to apply the present invention otherwise to the cases of quantizing and coding the image signal with the same effects.

In addition, it is also possible to constitute all or a part of the configurations of the coding unit in FIG. 1 as one IC chip, and furthermore, it is also possible to implement the functions in FIG. 1 with software processing using a microprocessor, a register, a RAM and so on.

In this case, a storage medium such as the memory storing a program for attaining the functions in FIG. 1 also constitutes the present invention.

As described above, according to the present invention, it is possible to implement assignment of the code amount without any waste and to determine an optimum quantization step considering visual effects.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image signal processing apparatus comprising:
   a rearranging unit configured to rearrange pictures of an input moving image signal in an order of predetermined picture types;
   a quantization unit configured to set a quantization step, and to quantize each picture of the moving image signal output from said rearranging unit according to the set quantization step;
   a coding unit configured to variable-length-encode the moving image signal quantized by said quantization unit; and
   a quantization step control unit having a quantization table in which values corresponding to a plurality of quantization steps to be used by said quantization unit are described, said quantization step control unit being configured to effect quantization step control to fixedly establish a different minimum value of the quantization steps in accordance with a picture type of the picture rearranged by said rearranging unit, so as not to set a quantization step corresponding to a value smaller than the minimum value which is established to the rearranged picture, to said quantization unit.

2. An apparatus according to claim 1, wherein said quantization step control unit effects control so as to assign an amount of redundant codes generated in the rearranged picture due to fixedly establishing of the minimum value of the quantization step, to a lower area of the rearrangement picture.

3. An apparatus according to claim 1, wherein said quantization step control unit fixedly establishes the minimum value of the quantization step in such a manner that the smaller minimum value is established for the I picture type than the P and B picture types.

4. An apparatus according to claim 1, wherein said quantization step control unit establishes the minimum value of the quantization value based on a code amount of a coded moving image signal outputted from said coding unit in a predetermined period.

5. An apparatus according to claim 1, wherein said quantization step control unit establishes the minimum value of the quantization value based on a characteristic of the input moving image signal.

6. An apparatus according to claim 1, wherein said quantization step control unit establishes the minimum value of the quantization value based on motion of the input moving image signal.

7. An apparatus according to claim 6, further comprising a motion compensation predictive unit configured to generate a predictive image signal from a reference picture of the picture to be coded of the moving image signal, and detect a motion vector for the predictive image signal,
wherein said quantization step control unit detects the motion of the input moving image signal based on the motion vector detected by said motion compensation predictive unit.

8. An apparatus according to claim 6, further comprising an image pickup unit configured to generate the input moving image signal,
wherein said quantization step control unit further establishes the minimum value of the quantization value according to an operating state of said image pickup unit.

9. An image signal processing method, comprising the steps of:
rearranging pictures of an input moving image signal in an order of predetermined picture types;
setting a quantization step, and quantizing each picture of the moving image signal output in said rearranging step according to the set quantization step;
variable-length encoding the moving image signal quantized in said quantization step; and
effecting quantization step control in accordance with a quantization table in which values corresponding to a plurality of quantization steps to be used in said quantization step are described, to fixedly establish a different minimum value of the quantization steps in accordance with a type of the picture rearranged in said rearranging step so as not to set a quantization step corresponding to a value smaller than the minimum value which is established the rearranged picture, to said quantization step.

10. An image signal processing apparatus comprising:
a rearranging unit configured to rearrange pictures of an input moving image signal and output a picture to be intra-picture coded and a picture to be inter-picture coded in accordance with a predetermined order;
a quantization unit configured to set a quantization step, and to quantize each picture of the moving image signal including the picture to be intra-picture coded and the picture to be inter-picture coded in accordance to the set quantization step;
a coding unit configured to variable-length-encode the moving image signal quantized by said quantization unit; and
a quantization step control unit having a quantization table in which values corresponding to a plurality of quantization steps to be used by said quantization unit are described, said quantization step control unit being configured to effect quantization step control to establish a different minimum value of the quantization steps between the picture to be intra-picture coded and the picture to be inter-picture coded, so as not to set a quantization step corresponding to a value smaller than the minimum value which is established to each of the pictures, to said quantization unit.

11. An apparatus according to claim 10, wherein said quantization step control unit establishes the minimum value of the quantization step in such a manner that the smaller minimum value is established for the picture to be intra-picture-coded than the picture to be inter-picture coded.

12. An image signal processing method, comprising the steps of:
rearranging pictures of an input moving image signal and output a picture to be intra-picture coded and a picture to be inter-picture coded in accordance with a predetermined order;
setting a quantization step, and to quantize each picture of the moving image signal including the picture to be intra-picture coded and the picture to be inter-picture coded, in accordance with the set quantization step;
variable-length-encoding the moving image signal quantized in said quantizing step; and
effecting quantization step control in accordance with a quantization table in which values corresponding to a plurality of quantization steps to be used in said quantizing step are described, to establish a different minimum value of the quantization steps between the picture to be intra-picture coded and the picture to be inter-picture coded, so as not to set a quantization step corresponding to a value smaller than the minimum value which is established to each of the pictures, to said quantizing step.

* * * * *